United States Patent
Rafique et al.

(10) Patent No.: US 11,303,381 B2
(45) Date of Patent: Apr. 12, 2022

(54) PROCESSING PARAMETER AND RESOURCE SHARING ARCHITECTURE FOR SUPERCHANNEL BASED TRANSMISSION SYSTEMS

(71) Applicant: Xieon Networks S.à.r.l., Luxembourg (LU)

(72) Inventors: Danish Rafique, Munich (DE); Bernhard Spinnler, Oberhaching (DE)

(73) Assignee: XIEON NETWORKS S.a.r.l., Luxembourg (LU)

( * ) Notice: Subject to any disclaimer, the term of this patent is extended or adjusted under 35 U.S.C. 154(b) by 531 days.

(21) Appl. No.: 16/084,461

(22) PCT Filed: Mar. 14, 2017

(86) PCT No.: PCT/EP2017/055899
§ 371 (c)(1),
(2) Date: Sep. 12, 2018

(87) PCT Pub. No.: WO2017/157883
PCT Pub. Date: Sep. 21, 2017

(65) Prior Publication Data
US 2019/0081726 A1    Mar. 14, 2019

(30) Foreign Application Priority Data

Mar. 14, 2016    (EP) .................................... 16160135

(51) Int. Cl.
*H04B 10/60* (2013.01)
*H04J 14/06* (2006.01)
(Continued)

(52) U.S. Cl.
CPC ............ *H04J 14/06* (2013.01); *H04B 10/616* (2013.01); *H04B 10/6162* (2013.01);
(Continued)

(58) Field of Classification Search
CPC ........ H04J 14/06; H04J 14/02; H04B 10/616; H04B 10/6162; H04B 10/6163; H04B 10/6164; H04B 10/60; H04L 27/2082
(Continued)

(56) References Cited

U.S. PATENT DOCUMENTS 9,106,503 B1 *    8/2015    Zhang ..................... H04L 27/38
9,602,151 B1 *    3/2017    Zamani .................... H04B 1/40
(Continued)

OTHER PUBLICATIONS

Coleri, S. et al., "Channel estimation techniques based on pilot arrangement in OFDM Systems," IEEE Transactions on Broadcasting, vol. 48(3):223-229 (2002).
(Continued)

*Primary Examiner* — Dibson J Sanchez (57) ABSTRACT

Disclosed is a receiver for receiving an optical signal comprising a plurality of carriers within a predetermined frequency band. The receiver comprises means for sampling and converting each of the carriers into a set of corresponding digital signals, and a digital processing unit for processing said digital signals of said set of digital signals such as to mitigate transmission impairments of the corresponding optical carriers based on corresponding processing parameters. The digital processing unit is configured for determining such processing parameters by carrying out a corresponding parameter derivation procedure based on one of the digital signals of said set of digital signals. The processing unit is configured for sharing thus determined processing parameters for processing of other digital signals among said set of digital signals based on said shared determined processing parameters, or processing parameters derived from said shared determined processing parameters.

19 Claims, 5 Drawing Sheets

(51) Int. Cl.
  *H04J 14/02* (2006.01)
  *H04B 10/61* (2013.01)
  *H04L 27/20* (2006.01)
(52) U.S. Cl.
  CPC ..... *H04B 10/6163* (2013.01); *H04B 10/6164* (2013.01); *H04J 14/02* (2013.01); *H04L 27/2082* (2013.01); *H04B 10/60* (2013.01)
(58) Field of Classification Search
  USPC .................................................. 398/202–214
  See application file for complete search history.

(56) References Cited

U.S. PATENT DOCUMENTS

| | | | | |
|---|---|---|---|---|
| 9,654,224 B2* | 5/2017 | Oyama | H04B 10/58 | |
| 2006/0024062 A1* | 2/2006 | Jakober | H04B 10/505 | 398/141 |
| 2009/0116844 A1* | 5/2009 | Tanaka | H04B 10/677 | 398/115 |
| 2010/0196017 A1* | 8/2010 | Tanimura | H04B 10/616 | 398/159 |
| 2010/0226423 A1* | 9/2010 | Chen | H04L 25/0216 | 375/232 |
| 2011/0103790 A1* | 5/2011 | Palacharla | H04B 10/2507 | 398/1 |
| 2011/0211842 A1* | 9/2011 | Agazzi | H04B 10/6971 | 398/141 |
| 2012/0237153 A1* | 9/2012 | Weimann | G02B 6/122 | 385/1 |
| 2012/0308234 A1* | 12/2012 | Bianciotto | H04B 10/6165 | 398/65 |
| 2013/0084080 A1* | 4/2013 | Shibutani | H04B 10/6161 | 398/208 |
| 2013/0272704 A1* | 10/2013 | Zamani | H04J 14/06 | 398/65 |
| 2013/0302041 A1* | 11/2013 | Matsui | H04B 10/6161 | 398/208 |
| 2015/0063818 A1* | 3/2015 | Zhou | H04B 10/516 | 398/115 |
| 2015/0117511 A1* | 4/2015 | Lyubomirsky | H04L 25/03057 | 375/233 |
| 2015/0280833 A1* | 10/2015 | Sun | H04J 14/06 | 398/208 |
| 2016/0204871 A1* | 7/2016 | Li | H04L 27/2601 | 398/183 |
| 2016/0308579 A1* | 10/2016 | Abe | H04B 10/61 | |

OTHER PUBLICATIONS

International Search Report and Written Opinion, PCT/EP2017/055899, dated May 24, 2017, 15 pages.
Jansen, S.L. et al., "Optical OFDM—A Candidate for Future Long-Haul Optical Transmission Systems," OFC/NFOEC 2008, 2008 Conference on Optical Fiber Communication/ National Fiber Optic Engineers Conference, Feb. 1, 2008, 3 pages.

* cited by examiner

PROCESSING PARAMETER AND RESOURCE SHARING ARCHITECTURE FOR SUPERCHANNEL BASED TRANSMISSION SYSTEMS

RELATED APPLICATIONS

This application is a 35 U.S.C. 371 national stage filing of International Application No. PCT/EP2017/055899, filed on Mar. 14, 2017, which claims priority to European Patent Application No. 16160135.6, Mar. 14, 2016. The entire contents of these applications are incorporated herein by reference in their entirety.

FIELD OF THE INVENTION

The present invention is in the field of optical data transmission. Critically, the invention relates to a receiver for receiving an optical signal comprising a plurality of carriers, and a related receiving method.

BACKGROUND OF THE INVENTION

Figure 1:
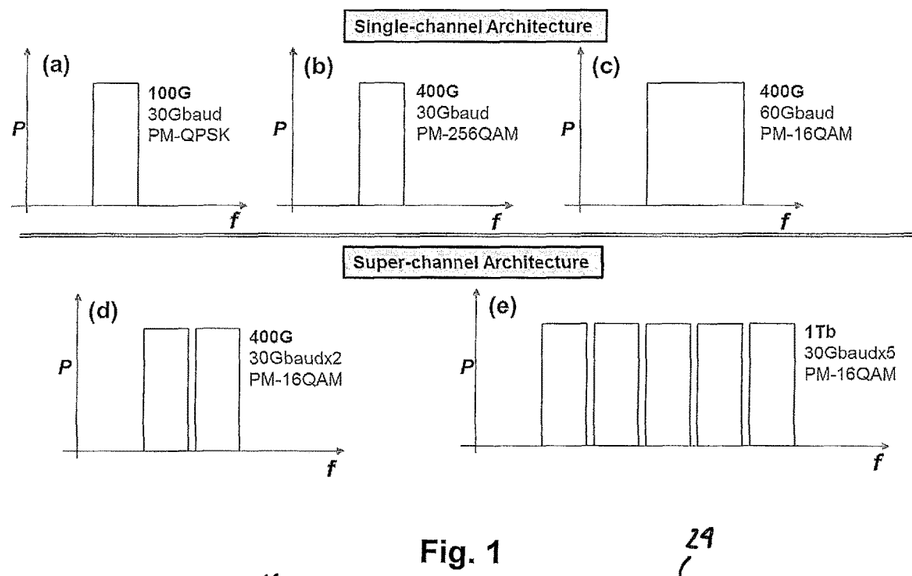
FIG. 1 is a schematic overview illustrating single channel and super channel architectures.

In optical networks using coherent carriers, currently available data transfer rates are on the order of 100 Gb/s per channel. As indicated in FIG. 1(a), a data transfer rate of 100 Gb/s can e.g. be achieved using polarization division multiplexing quaternary phase shift keying (PM-QPSK) with a symbol rate of 30 Gbaud. In FIGS. 1(a) to 1(e), the horizontal axis represents the frequency and the vertical axis the signal power.

In order to increase the data transmission rates, either higher order modulation formats or higher baud rate transmission systems could in principle be employed. For example, as indicated in FIG. 1(b), a data transmission rate of 400 Gb/s can be obtained by using a PM-256QAM modulation format and a symbol rate of 30 Gbaud. However, this modulation scheme is extremely sensitive to the optical signal-to-noise ratio (OSNR), which is a limiting factor for the transmission performance.

Alternatively, a data transmission rate of 400 Gb/s could conceivably be obtained using a PM-16QAM modulation format and an increased symbol rate of 60 Gbaud, as shown in FIG. 1(c). However, in practice the highest baud rates currently achievable are in fact on the order of 30 Gbaud, due to the limited speed of the available digital electronics.

In view of this, currently the PM-16QAM modulation format is regarded as an optimum compromise between improved data transfer rate and reduced tolerance to noise, or, in other words, increased OSNR requirements. However, this only allows for a moderate increase in the data transmission rate up to approximately 200 Gb/s per channel.

A further improvement can be achieved by means of so-called "super channels", in which several sub-channels, referred to herein as "carriers", are packed in a fixed band width and are treated as a single channel in the network. Since the carriers of the super channel are jointly treated as a single channel by the network and hence need not be separated by means of filters or the like upon traversing the network, the carriers of the super channel can be more densely spaced than ordinary WDM channels, so that more information can be transmitted per band width as compared to ordinary WDM channels. This is schematically shown in FIGS. 1(d) and 1(e), where super channels with two and five carriers, respectively, are shown. Assuming again a symbol baud rate of 30 Gbaud and a PM-16QAM modulation format, the two carrier multichannel of FIG. 1(d) allows for a data transmission rate of 400 Gb/s, and the five carrier super channel of FIG. 1(e) for a data transmission rate of 1 TB/s.

Figure 2:
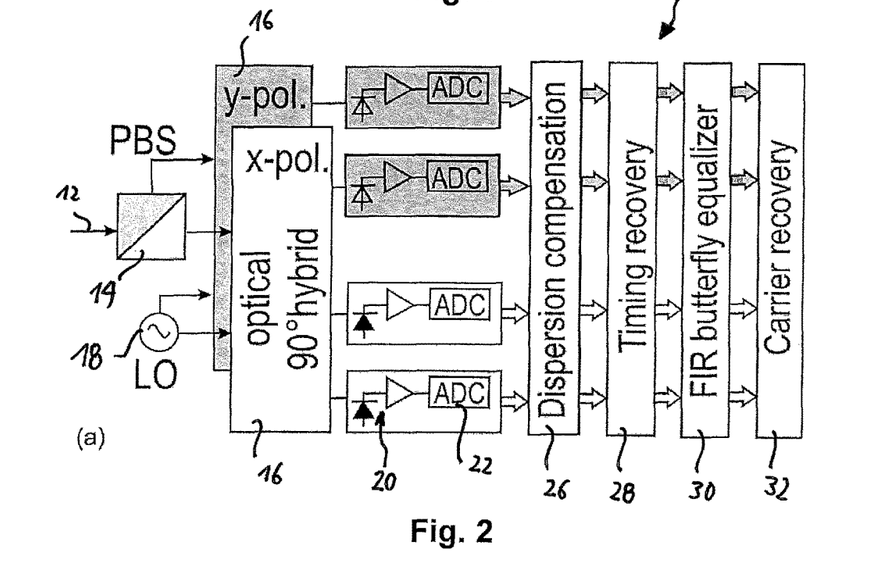
FIG. 2 is a schematic view of a prior art coherent receiver including a processing unit for processing digital signals such as to mitigate transmission impairments of the corresponding optical signal.

As compared to older modulation and detection techniques such as intensity modulation with direct detection (sometimes referred to as Non-Return to Zero or On/Off Keying), coherent technology enables higher data rates to be sent over long haul (typically >2,000 km) optical transmission networks. FIG. 2 shows a schematic diagram of a coherent receiver 10. An incoming optical data signal 12 is split by means of a polarization beam splitter 14 in two polarization components X and Y. Each of the polarization components is mixed in a 90° optical hybrid 16 with a local oscillator signal 18 for demodulating the signal, thereby generating optical in-phase and quadrature components for each of the polarizations X and Y. These optical in-phase and quadrature components are detected using photodiodes 20 and transferred to the digital domain using analog-digital-converters (ADC) 22. This way, the incoming optical data signal 12 is sampled and converted into a corresponding digital signal, where the "digital signal" in this case comprises four digital signal components representing the in-phase and quadrature components of each of the X and Y polarization components. In the present disclosure, it is understood that the term "digital signal" can refer to a combination of such related signal components.

The coherent receiver 10 is further configured for processing said digital signal such as to mitigate transmission impairments of the optical signal 12 in the digital domain. Examples of such transmission impairments are chromatic dispersion, polarization mode dispersion, differential group delay, polarization mixing, and symbol timing uncertainties. Further impairments regarded as "transmission impairment" within the broad meaning of the word in the present disclosure comprise, without limitation, a frequency offset in the optical signal or in the transmitter or receiver clock, fiber nonlinearities, power fluctuations, amplitude imbalances or phase imbalances. For this purpose, the coherent receiver 10 comprises a processing unit 24, for example a digital signal processor (DSP), which provides several processing functionalities, namely a chromatic dispersion compensation functionality 26, a timing recovery functionality 28, a finite impulse response (FIR) butterfly equalizer 30 (also referred to as a multiple input multiple output (MIMO) filter), and a carrier recovery functionality 32. The recovery functionality can e.g. be materialized in corresponding digital filters.

The processing according to such functionalities is usually based on processing parameters reflecting, at least in part, transmission impairments of the received optical signal. For example, for the chromatic dispersion compensation functionality 26, the processing requires information about the amount of chromatic dispersion (CD) acquired by the signal, and a corresponding CD value would be an example of a processing parameter "reflecting transmission impairments of the received optical signal". Such processing parameters are typically determined by carrying out a corresponding parameter derivation procedure based on the digital signal.

The derivation of the processing parameters by means of the corresponding parameter derivation procedure can be quite demanding both with regard to processing time and computing power. While FIG. 2 shows the coherent detection and digital compensation for transmission impairments for a single incoming optical signal 12 only, it is to be noted that the coherent receiver 10 will generally receive many wavelength division multiplexing (WDM) channels, each of which are to be digitally processed for transmission impairment compensation. When using multi-channels as shown in FIGS. 1(d) and 1(e), although the multichannel is regarded as "one channel" from the network point of view, still the digital processing described above needs to be carried out for each of the carriers of the super channel, thereby leading to an even further increased demand for processing power and also electrical energy consumption. A similar situation arises for subcarrier multiplex (SCM) signals. In SCM signals, baseband data is first modulated on a subcarrier, that is subsequently modulated onto the optical carrier. This way, each signal occupies a different portion of the optical spectrum surrounding the center frequency of the optical carrier.

SUMMARY OF THE INVENTION

A problem underlying the invention therefore is to provide a method and an apparatus to enable high data transmission rates with moderate digital processing effort.

This problem is solved by a receiver according to claim 1 and a method according to claim 14. Preferable embodiments are defined in the dependent claims.

The present invention provides a receiver for receiving an optical signal comprising a plurality of carriers within a predetermined frequency band, such as a super channel signal. Alternatively, the optical signal comprising a plurality of carriers within a predetermined frequency band could be a set of sub channels of a sub carrier multiplex signal. The receiver comprises means for sampling and converting each of the carriers into a set of corresponding digital signals, and one or more digital processing units for processing said digital signals of said set of digital signals such as to mitigate transmission impairments of the corresponding optical carriers based on corresponding processing parameters.

At least one of said at least one digital processing units is configured for determining such processing parameters by carrying out a corresponding parameter derivation procedure based on one of the digital signals of said set of digital signals, said processing parameters reflecting, at least in part, transmission impairments of the corresponding received optical carrier. Said at least one digital processing unit is/are configured for sharing thus determined processing parameters, for processing of other digital signals among said set of digital signals based on said shared determined processing parameters, or
processing parameters derived from said shared determined processing parameters.

According to the invention, the at least one digital processing unit of the receiver is hence configured for sharing processing parameters, which typically have been obtained in a cumbersome and possibly time-consuming parameter derivation procedure based on only one digital signal among said set of digital signals, for the purpose of processing other digital signals among said set of digital signals. Herein, in the simplest case, the shared determined processing parameter can be used as it is for processing of the other digital signals. Alternatively, instead of simply using the determined processing parameters for the processing of other digital signals, it is possible to derive the processing parameters for the other digital signals from said shared determined processing parameters, which still allows for saving computational effort and time as compared to the usual situation, in which for each of the digital signals, the processing parameter derivation procedure is carried out independently.

Note that at first sight, the skilled person would not expect that any benefit could be gained by sharing such processing parameters, because the processing parameters derived for digital signals corresponding to different carriers would be expected to differ significantly from each other. However, the inventors have noted that when different optical signals travel along the same optical paths in the network, and if the optical signals are very close in wavelength, then it is found that they do in fact experience comparable transmission impairments, leading to processing parameters that are sufficiently correlated to make it worthwhile sharing them among the digital signals to thereby lead to an overall reduction in processing effort or increase in processing speed. Moreover, while usually different optical channels received at a receiver will have significantly different wavelengths and will not have traveled along the same path in the network (and therefore have picked up different transmission impairments), precisely the opposite is true for the carriers of a super channel, which are by definition densely spaced and transmitted on the same path through the network Examples of transmission impairments that can be mitigated by digital processing in the framework of the invention comprise one or more of chromatic dispersion, polarization mode dispersion, differential group delay, polarization mixing, symbol timing uncertainties, carrier frequency drift or clock frequency drift on the transmitter or receiver side, fiber nonlinearities, power fluctuations, amplitude imbalance or phase imbalance.

In a preferred embodiment, the digital processing unit comprises a digital filter, in particular a multiple input multiple output filter, and the processing parameters correspond to filter settings. In particular, the one or more digital processing units may comprise a finite impulse filter (FIR), and the processing parameters may comprise filter parameters, such as filter tap informationNote that such filter settings, such as filter tap information, is usually derived in a corresponding procedure, referred to as "parameter derivation procedure" herein, based on the digital signals themselves. The filter settings that are determined this way are dependent on the transmission impairments present in the optical signal, and hence reflect, at least in part, such transmission impairments of the corresponding received optical carrier. Note that the digital processing unit may also comprise infinite impulse response filters. Also, the processing unit may operate in the frequency domain, using FFT, multiplication and inverse FFT.

In a preferred embodiment, the at least one digital processing unit is configured for determining approximative processing parameters by carrying out a corresponding parameter derivation procedure based on only one of the digital signals of said set of digital signals, and sharing said approximative processing parameters for processing some or all of the other digital signals based on said approximative processing parameters, or based on processing parameters derived therefrom.

For example, if the processing is carried out for compensating effects due to chromatic dispersion (CD), then the approximative processing parameter could be a chromatic dispersion value derived from one of the digital signals corresponding to a selected one optical carrier, and the same chromatic dispersion value, could be used in the chromatic dispersion compensation for the other digital signals corresponding to the other optical carriers. Herein, the CD value derived based on one of the digital signals need not be precisely the same as the respective true CD values applying for the other optical carriers, but could be a reasonable estimate based on which the processing could be carried out. In this sense, the shared determined CD value is only an "approximative processing parameter" as far as the processing of the other digital signal is concerned. As used herein, the term "CD value" could correspond to the ratio of a group delay (measured in picoseconds) versus wavelength (nm). This ratio is a property of the fiber, and should hence be the same for each carrier. However, the "CD value" could also correspond to the group delay itself, in which case the delay applying for another signal with a different wavelength would have to be computed, based on the chromatic dispersion and taking into account the difference in wavelength of the carriers.

Alternatively, the shared CD value could be used as a starting point for determining the more precise CD values applying for the other optical carriers, which would still be more efficient than deriving the CD values for each of the other optical carriers from scratch. This would be an example in which the processing parameter for processing some or all of the other digital signals are "derived from the approximative processing parameter", i.e. the shared chromatic dispersion value in this example. Moreover, if the shared approximative processing parameter is to be fine-tuned with respect to the other digital signals anyhow, it need not be derived to full precision prior to sharing, and can be regarded as "approximative" for this reason as well.

As a further example, if the processing parameters should correspond to filter settings, then the filter settings derived based on only one of the digital signals would form "approximative processing parameters" that could be shared for processing some or all of the other digital signals based on the same filter settings. These same filter settings may not be optimum, but due to the similarity in the transmission impairments suffered by the closely spaced optical carriers traveling on the same network path, they could still lead to a fairly good compensation of transmission impairments. Moreover, these filter settings could be used as a starting point in an optimization procedure for filter settings, which would converge much faster as compared to starting from an arbitrary starting point. In this example too, the optimized filter settings would then be "derived from the approximative processing parameters", i.e. from the shared filter settings.

In a preferred embodiment, said at least one processing unit is configured for determining said approximative processing parameters by searching within a possible space of parameters using a coarser granularity, and for deriving said processing parameters from said approximative parameters by searching within said space of parameters using a finer granularity. For example, if the processing parameter is again a CD value, then the approximate value of the chromatic dispersion can be determined in a parameter derivation procedure based on only one of the digital signals by searching the relevant parameter space with a coarser granularity, thereby allowing for only detecting a certain region within the parameter space including the true chromatic dispersion value. Information about this region, for example the center value of the chromatic dispersion within this region, would then form an approximative processing parameter from which the more precise processing parameters for the other digital signals can be quickly and effectively derived by searching the parameter space in proximity to the approximative processing parameter with a fine granularity.

In these examples, first only one of the digital signals is subjected to a parameter derivation procedure, instead of carrying out the parameter derivation procedures for all digital signals from scratch in parallel. This way, the total processing effort can be greatly reduced, leading to less power consumption and a more efficient use of the data processing capabilities.

In contrast to this, the invention also allows for improving the processing accuracy or speed by carrying out a parameter derivation procedure for several or all digital signals in parallel, and sharing the determined processing parameters for example for the purpose of better accuracy or faster convergence times.

For example, in a preferred embodiment, said at least one digital processing unit is configured for
    sharing the determined processing parameters by combining processing parameters determined based on different ones of said digital signals, and
    providing the combined processing parameters for processing individual ones of said digital signals, in particular all of said digital signals, based on said combined processing parameters, or parameters derived therefrom.

A simple example of combining determined processing parameters is to determine an average thereof. Averaging processing parameters can be useful to increase precision if the processing parameters for the individual digital signals are expected to be identical. For example, if the transmission impairment would be a frequency offset of the carriers, and the carriers are generated by frequency locked lasers or generated from a single source, then this frequency offset would be expected to be identical for each of the optical carriers, and accordingly, the processing parameters for compensating the frequency offset in the digital signals would likewise be identical. By determining the corresponding processing parameters in parallel for several or all of the digital signals, and then "combining" the determined processing parameters to determine a mean value thereof, the accuracy can be improved. Note that more sophisticated ways of "combining" are likewise within the scope of the present invention.

A similar situation arises in case of a clock frequency offset between the sampling clocks at the transmitter and at the receiver, assuming that all carriers of the super channel share the same sampling clock. Such clock offsets are also considered as "transmission impairments" for the purposes of the present invention. In this case too, the determined processing parameters for handling the clock offsets, such as a parameter representing a clock offset value, can be "combined" by determining the mean value thereof, to thereby improve the accuracy.

According to a further preferred embodiment, said at least one digital processing unit is configured for
    comparing processing parameters determined based on different ones of said digital signals,
    selecting a subset of said determined processing parameters based on said comparison, and
    providing the selected subset of processing parameters for use in processing individual ones of said digital signals, and in particular all of said digital signals, based on said selected subset of processing parameters or processing parameters derived therefrom.

According to this embodiment, again processing parameters may be determined in parallel based on different digital signals using a corresponding parameter derivation procedure. These determined processing parameters can then be compared with each other. For example, different regions of a possible parameter space can be searched based on different ones of the digital signals, thereby leading to different tentative processing parameters. These tentative processing parameters can then be compared with each other, for example based on the comparison of an error function associated therewith or the like, and a subset of said determined processing parameters can be selected based on said comparison, for example the determined processing parameters corresponding to one of the digital signals for which the error function was the smallest. This selected subset of processing parameters—or processing parameters derived therefrom—can then be used for processing all the other digital signals. This way, the problem of determining the optimum processing parameters can be largely parallelized, thereby reducing the time needed for deriving suitable processing parameters. This is particularly advantageous in case of system or component startup, where convergence times in the parameter derivation procedure could otherwise be fairly long and hence delay the system or component start.

In various embodiments, said at least one processing unit is configured for determining said parameters based on different ones of said digital signals in an iterative procedure, in particular in an iterative optimization procedure, based on a predetermined start configuration, wherein said predetermined start configurations are different for different ones of said digital signals. This embodiment is based on the observation that in cases where the parameter derivation procedure is an iterative procedure, the accuracy of the result obtained after a given number of iterations will strongly depend on the start configuration used. Namely, for some start configurations, there will be short convergence times while for others, convergence would be slow. In cases where there is uncertainty about suitable start configurations, according to this embodiment, the parameter derivation procedure can be carried out in parallel based on different digital signals and different tentative start configurations. Then, after a predetermined number of iterations, the determined processing parameters can be compared, and the best subset of processing parameters can be chosen, where the best subset of processing parameters corresponds to those determined using a more favorable start configuration. Accordingly, this embodiment again allows for a faster convergence time for deriving at least approximative processing parameters that can be shared for processing different digital signals.

In a preferred embodiment, the frequency band has a band width of 800 GHz or less, preferably 400 GHz or less. This choice of width of the frequency band ensures that the carriers are close enough in frequency that the sharing of processing parameters in one of the ways described above allows for an increase in processing efficiency and/or a decrease in processing time.

As mentioned above, in preferred embodiments, said optical signal comprising a plurality of carriers is a super channel signal.

In a preferred embodiment, the receiver comprises or is formed by at least one photonic integrated circuit. Preferably, said one or more digital signal processing units comprises or is formed by a digital signal processor. However, the one or more digital signal processing units could also be formed by an ASIC or an FPGA.

DESCRIPTION OF THE PREFERRED EMBODIMENTS

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

Figure 3:
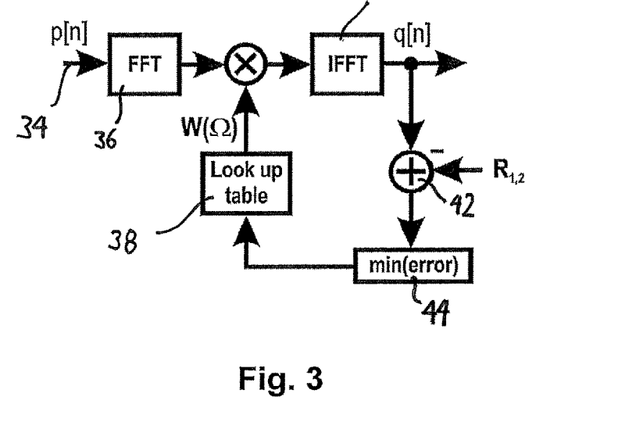
FIG. 3 is a diagram summarizing a prior art chromatic dispersion compensation algorithm that can be implemented in a digital filter or processing unit.

FIG. 3 is a schematic diagram showing an example of a prior art algorithm for processing a digital signal for estimating and compensating chromatic dispersion. A detailed description of this algorithm is provided in "Adaptive Chromatic Dispersion Equalization for Non-Dispersion Managed Coherent Systems" by M Kuschnerov, F. N. Hauske, K Piyawanno, B. Spinnler, A. Napoli, B. Lankl, Optical Fiber Communication Conference, 2009, no OMT1] incorporated herein by reference. As shown in FIG. 3, an incoming digital signal 34 is Fourier transformed using a fast Fourier transform block 36. The Fourier transformed signal is multiplied with a transfer function $W_{CD}(\Omega)$ which compensates the effects of a given value of chromatic dispersion (CD). Suitable transfer functions $W_{CD}(\Omega)$ for each CD value are stored in a look up table 38. Accordingly, if the CD value is known, then the incoming digital signal 34 can be processed to reverse the effect of CD by applying the properly chosen transfer function. Note that the CD value is hence an example of the "processing parameter" referred to in the introductory portion of the description.

Further, the algorithm of FIG. 3 is suitable for carrying out a "parameter derivation procedure" of the type referred to above. For this purpose, the product of the Fourier transformed digital signal and the selected transfer function $W_{CD}(\Omega)$ is subjected to an inverse Fourier transformation by block 40, thereby yielding a processed digital signal in which the effect of chromatic dispersion is at least partly compensated for. The extent to which the compensation is successful can be estimated based on an error criterion derived from a Constant Modulus Algorithm (CMA), which essentially penalizes deviations from a constant power represented by two normalization constants $R_1$ and $R_2$ that are subtracted from squared signal amplitudes using the subtracting block 42 according to a suitable error function yielding an error value. This way, simply put, different CD values are tried such as to minimize the error as defined by the error function. This error minimization is carried out by block 44 in FIG. 3.

Figure 4:
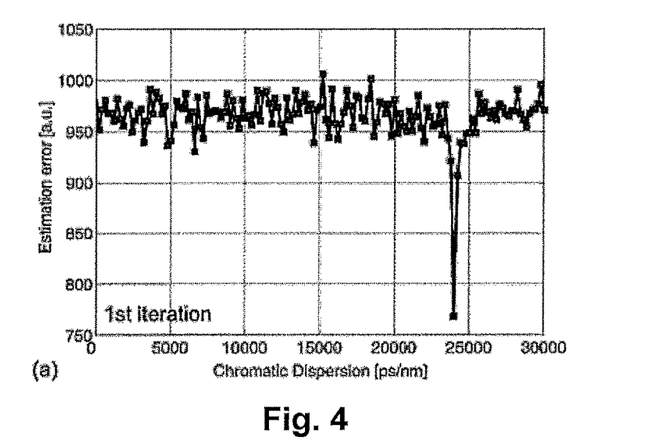
FIG. 4 is a diagram showing an estimated error determined with the algorithm of FIG. 3 for different values of chromatic dispersion in a first iteration thereof.

If there is no pre-assumption about the CD value, which could for example be the case at system startup, in a first iteration, CD values are successively tried out e.g. starting from a vanishing CD value of 0 ps/nm, and increasing the CD value in each step by e.g. 200 ps/nm. This first iteration is hence an example of a search within a possible space of processing parameters using a relatively coarse granularity. For each CD value, the corresponding error is determined using block 44 of FIG. 3. The result of the error obtained in this first iteration is shown in FIG. 4, which is taken from the article cited above. From this first iteration, it can already be seen that the CD value must be close to 24,000 ps/nm.

Figure 5:
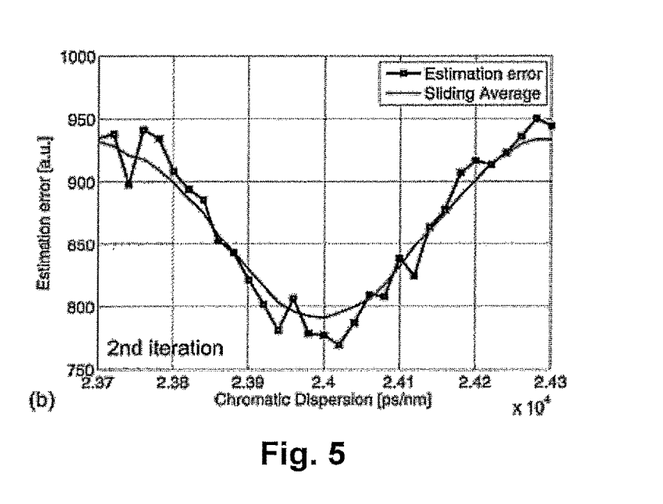
FIG. 5 is a diagram showing an estimated error determined with the algorithm of FIG. 3 for different values of chromatic dispersion in a second iteration thereof and in a CD-parameter range close to the minimum of the diagram of FIG. 4.

In a second iteration, a smaller region of the parameter space around 24,000 ps/nm is scanned using a 10 times finer granularity, i.e. steps of only 20 ps/nm. The result of the error values and a sliding average thereof are shown in FIG. 5. From the minimum of the sliding average, the proper CD value can be determined with high precision.

Note that the algorithm shown in FIG. 3 can be carried out by a digital processing unit, which could be provided by a DSP. The compensating functionality is essentially a filtering functionality, which is why the corresponding functionality of the processing unit could also be referred to as a "digital filter".

Figure 6:
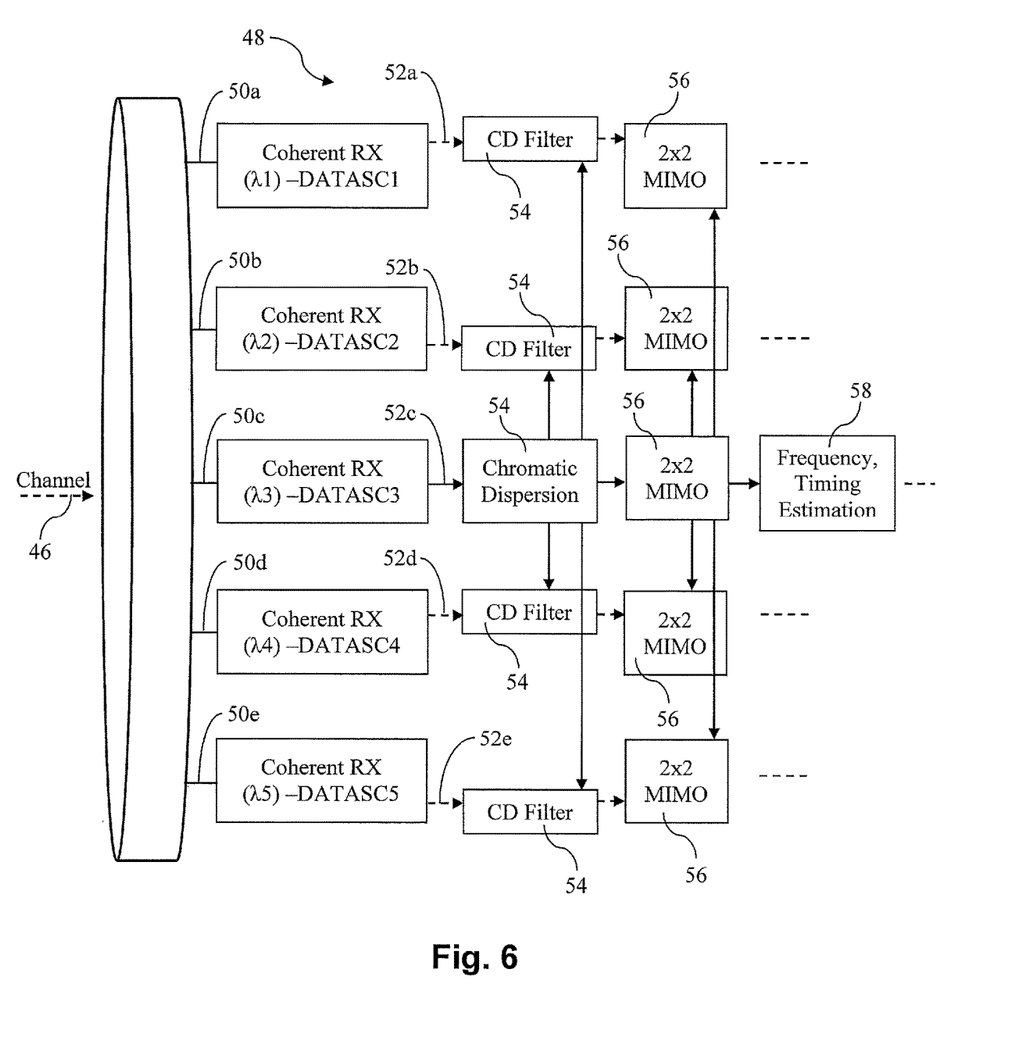
FIG. 6 is a schematic presentation of a receiver according to an embodiment of the invention showing the sharing of CD values and filter setting information.

In FIG. 6, a receiver 45 according to an embodiment of the present invention is schematically shown. As is shown in FIG. 6, the receiver 45 receives an incoming optical signal 46, which in the present embodiment is a super channel signal comprising five carriers 50a to 50e having closely spaced wavelengths $\lambda_1$ to $\lambda_5$. Using a typical coherent receiver front end 48 (not shown in detail), each of the optical carriers 50a to 50e are sampled and converted to corresponding digital signals 52a to 52e. The digital signals 52a to 52e are next each processed to compensate for chromatic dispersion using CD filters 54. Each of said CD filters 54 could form a "processing unit" as referred to in the introductory portion of the description. However, all of the filters of the receiver 45 of FIG. 6 could also be materialized in a single processing unit, such in a DSP under suitable programming. The CD filters 54 shown in FIG. 6 could for example employ the algorithm or filter structure shown in FIG. 3. However, if the CD values are not yet known, prior to actually processing the digital signals 52a to 52e for CD compensation, first the CD value derivation procedure described above with reference to FIGS. 4 and 5 needs to be carried out.

While according to prior art each of the filters 54 would individually carry out the full CD value derivation procedure, according to the embodiment shown in FIG. 6, at first only one of the digital signals, in the embodiment shown the digital signals 52c corresponding to the carrier 50c having the center frequency of the super channel signal 46, is processed such as to determine the CD value, while all the other CD filters 54 would remain idle with regard to processing parameter derivation. Once the CD value has been determined based on the digital signal 52c, this CD value can be shared with the other CD filters 54. Since all carriers 50a to 50e are part of one super channel signal 46 and hence have passed through the same network path prior to arriving at the receiver 45, and since the wavelengths $\lambda_1$ to $\lambda_5$ are similar to each other, it can be assumed that they have suffered from very similar chromatic dispersion. Accordingly, the CD value obtained for the single digital signal 52c can simply be shared with the other CD filters 54 for processing the remaining digital signals 52a, 52b, 52d and 52e.

Instead of directly using the CD value determined from signal 52c, the CD filters 54 could also use this CD value for limiting their own CD value derivation procedure to a small parameter range close to this CD value, so that a very precise CD value can e.g. be derived in a single iteration, which would correspond to the "second iteration" shown in FIG. 5, while the "first iteration" of FIG. 4 would be obsolete in view of the information shared by the parameter derivation based on the digital signal 52c. This would be an example of processing the further digital signals 52a, 52b, 52d and 52e "based on processing parameters derived from said shared determined processing parameters" referred to in the introductory part of the specification. As is apparent from the above, this way the total processing effort can be significantly reduced.

With further reference to FIG. 6, the digital signals 52a to 52e are further processed using 2×2 multiple input multiple output (MIMO) filters 56 in order to reverse impairments due to residual CD, differential group delay (DGD) and polarization mode dispersion (PMD). For processing the digital signals 52a to 52e, corresponding filter settings have to be determined, such as the filter tap weights or coefficients. Such filter tap weights are another example of "processing parameters" to be used in processing the digital signals 52a to 55e. Again, these filter tap weights can be determined based on the corresponding digital signal in an iterative procedure which is per se known from prior art and shall not be repeated here. In the embodiment shown, the filter tap weights are likewise only determined based on the digital signal 52c and shared with the other MIMO filters 56, which further allows to reduce the overall processing effort. In some cases, the shared filter tap information could simply be used by the other MIMO filters 56. Alternatively, the filter tap information could be used as a starting point for optimizing the further MIMO filters 56, which optimization would then rapidly converge.

Note that the CD values or filter tap weights determined based on the single digital signal 52c are examples of "approximative processing parameters" referred to in the introductory part of the specification. Even if these processing parameters are determined with high precision based on the digital signal 52c, they may be only "approximative" processing parameters for the other signals 52a, 52b, 52d, 52e, since the optimum processing parameters need not be precisely the same for different digital signals. However, these processing parameters could also be "approximative" in the sense that they are not determined to high precision prior to sharing them. This could be useful under the assumption that some further optimization of the processing parameters prior to processing the other digital signals 52a, 52b, 52d and 52e will be necessary anyhow. For example, with reference again to the CD filtering described with reference to FIGS. 3 to 5, in some embodiments it would be possible to share the tentative CD value based on the first iteration with the other CD filters, and to then carry out a further iteration for each of the individual signals 52a to 52e.

Although in FIG. 6 only CD filters 54 and 2×2 MIMO filters 56 are shown, it is understood that the receiver 45, more precisely its processing unit(s) may comprise further filters for processing the signal further such as to mitigate other transmission impairments. Accordingly, the chain of filters for each digital signal 52a to 52e can be extended as desired. To indicate this fact, in FIG. 6 a further unspecified filter 58 is shown, which could be used for frequency or timing error estimations or the like. For these filters too, processing parameters need to be derived in a similar way as described above, and can be shared among the individual filters employed for processing different ones among the digital signals 52a to 52e.

Figure 7:
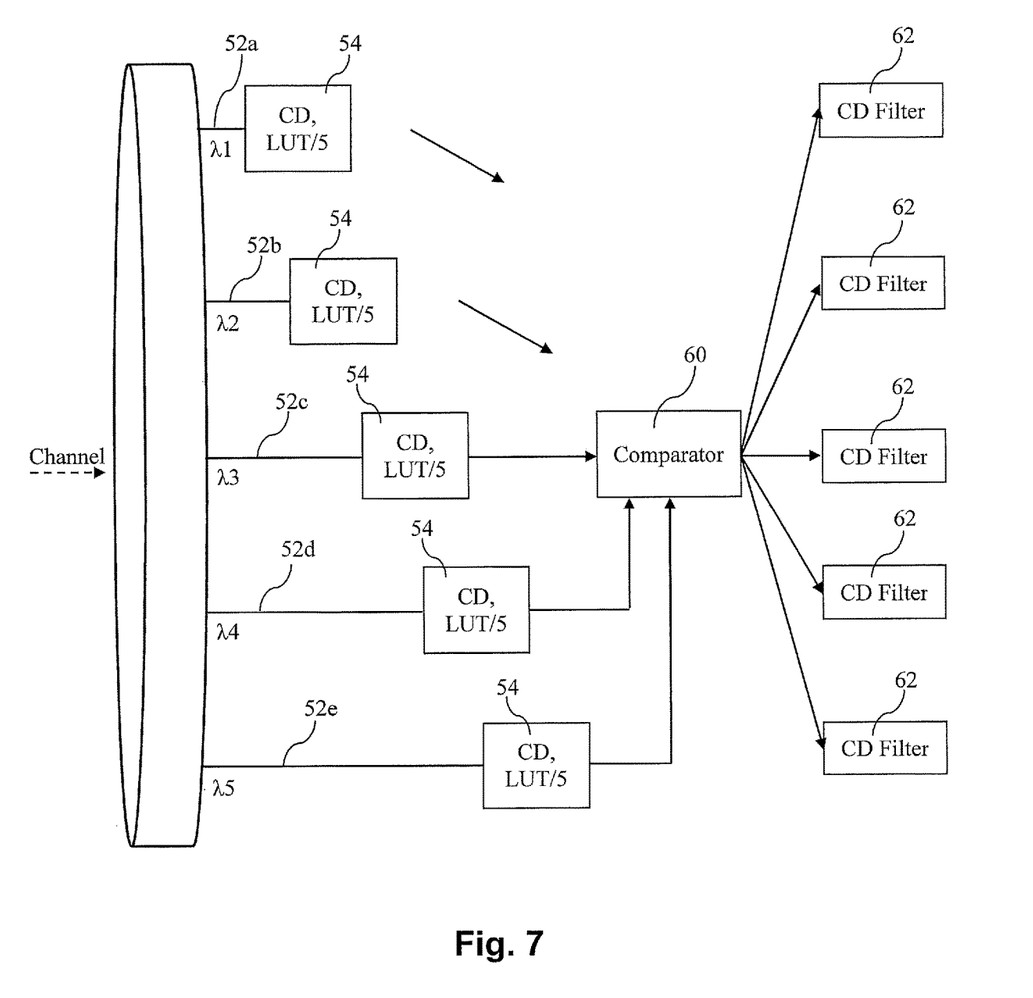
FIG. 7 is a schematic diagram of a receiver according to an embodiment of the invention in which CD values obtained in parallel based on different digital signals are combined and compared with each other.

While the embodiment shown in FIG. 6 mainly allows for reducing the overall processing effort and the associated power consumption, FIG. 7 schematically shows an alternative embodiment which allows for a faster completion of the parameter derivation procedure. In FIG. 7, again five CD filters 54 are shown which again could be of the type described with reference to FIG. 3 above. In the embodiment of FIG. 7, however, all CD filters 54 carry out the parameter derivation procedure in parallel, but within different parts of the parameter space. Accordingly, the entire parameter space can be scanned with same precision at 1/5 of the time. If a lookup table 38 is employed at as shown in FIG. 3, then only a fifth of each lookup table has to be considered by each CD filter 54, which is indicated by "LUT/5" in FIG. 7. Each of the five CD filters 54 submits the CD value within its corresponding parameter region leading to the smallest error to a comparator 60.

Among these CD values, the one leading to the smallest overall error according to the filter error function is determined by the comparator 60, and is forwarded to further CD filters 62 which carry out the signal processing based on this CD value. Note that this selected "best" CD value is an example of the "selected subset of processing parameters" referred to in the introductory portion of the specification. The further CD filters 62 can then carry out the processing of the corresponding digital signals 52a to 52e based on this selected CD value, or based on a CD value derived therefrom e.g. by further parameter optimization.

Figure 8:
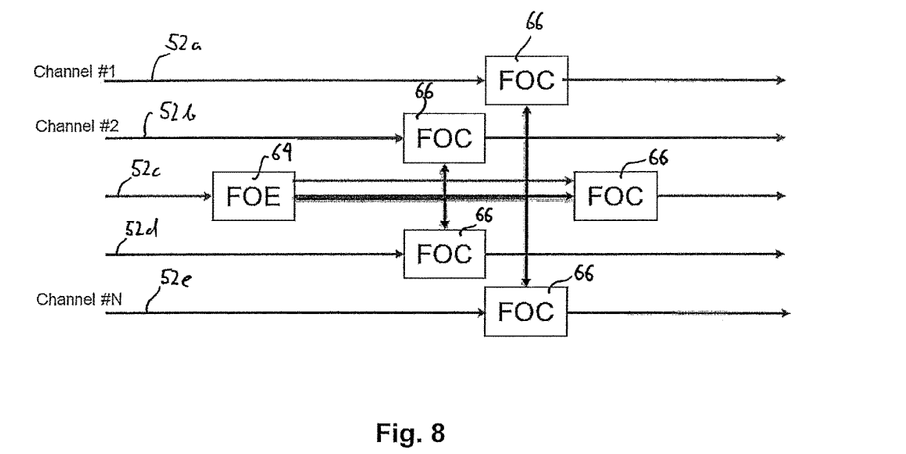
FIG. 8 is a schematic diagram showing the functionality of a receiver according to an embodiment of the invention allowing for frequency offset estimation based on one digital signal only and sharing frequency offset information for processing of further digital signals.

A further example of digital signal processing for mitigation of transmission impairments is a frequency offset compensation (FOC) schematically shown in FIG. 8. Assuming that the carriers 50a to 50e of the super channel signal 46 are generated by frequency locked lasers or generated from a single laser source, the frequency offset is expected to be the same for each of the carriers. In the embodiment shown in FIG. 8, a frequency offset estimation (FOE) is carried out again only for the digital signal 52c corresponding to the optical carrier 50c having this central frequency of the super channel 46. The FOE is carried out by a corresponding processing block or filter 64. Note that the FOE is a further example of a "processing parameter derivation procedure", and the derived processing parameter is a frequency offset value. In the embodiment of FIG. 8, the frequency offset value is shared with frequency offset compensation (FOC) filters 66, which process the corresponding digital signals 52a to 52e using the frequency offset value. Accordingly, the overall processing effort can be reduced as compared to the ordinary situation, in which the FOE would be carried out individually for each carrier 52a to 52e.

Figure 9:
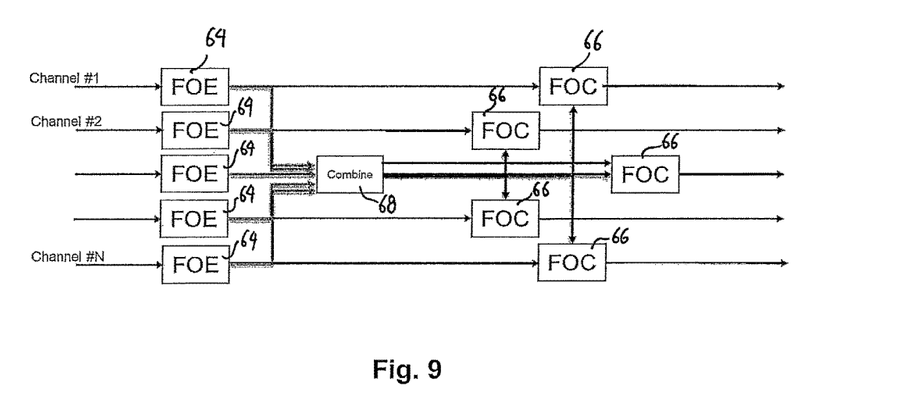
FIG. 9 is a schematic diagram showing the functionality of a receiver according to an embodiment of the invention allowing for frequency offset estimation based on a combination of frequency offset information derived from all of the digital signals.

FIG. 9 shows an alternative scenario, in which the FOE is carried out individually for each carrier 52a to 52e. The frequency offset values are then combined in a combiner 68, which calculates an average of the frequency offset values and provides the same to the FOC filters 66. This is an example where by combining individually determined processing parameters, the precision of the combined processing parameter can be improved.

Similar to the situation of the FOC described above, it is possible to compensate for clock frequency offsets rather than carrier frequency offsets in generally the same manner. This can be done under the assumption that all optical carriers 50a to 50e and digital signals 52a to 52e are subjected to the same sampling clocks at the transmitter and the receiver. In this case, the same benefits as described with reference to the FOC apply.

As mentioned above, the inventive concept of sharing processing parameters in a receiver is particularly important at system or component startup, where there is no a priori knowledge about the processing parameters, and the parameter derivation procedure would take the most computational effort. However, the invention also has very useful applications during operation of the receiver 45. For example, consider that under operation only one of the receiver 45 of FIG. 6, only one of the 2×2 MIMOs 56 (the "master MIMO") is constantly adapted to changing transmission impairments, i.e. changing values of residual CD, DGD, PMD, and the adapted filter settings are used for the other ("slave") MIMOs 56. Accordingly, adaption of the filter settings of the slave MIMOs is idle during this period. Only if a predetermined idle time has passed, or if a certain trigger criterion is met, the corresponding slave MIMO will carry out a filter setting adaption process. This trigger criterion could for example be that the corresponding bit error rate (BER) increases beyond a certain fixed threshold, or increases beyond a dynamic threshold determined from the current BER of the digital signal processed by means of the constantly adjusted master MIMO, or beyond a dynamic threshold derived based on the fluctuations of the settings of the master MIMO. Herein, again the "filter settings" could correspond to tap weights or tap coefficients of the filter.

Although a preferred exemplary embodiment is shown and specified in detail in the drawings and the preceding specification, these should be viewed as purely exemplary and not as limiting the invention. It is noted in this regard that only the preferred exemplary embodiment is shown and specified, and all variations and modifications should be protected that presently or in the future lie within the scope of protection of the invention as defined in the claims.

LIST OF REFERENCE SIGNS 10 receiver
12 incoming optical signal
14 polarization beam splitter
16 optical 90° hybrid
18 local oscillator
20 photodiode
22 analog-digital-converter
24 processing units
26 dispersion compensation functionality/filter
28 timing recovery functionality/filter
30 FIR butterfly equalizer
32 carrier recovery functionality/filter
34 incoming digital signal 36 Fast Fourier Transform block
38 lookup table
40 inverse Fast Fourier Transform block
42 subtracter
44 error estimation block
45 receiver
46 incoming super channel signal
48 coherent receiver front end
50a-50e carriers of super channel signal 46
52a-52e digital signals corresponding to carriers 50a-50e
54 CD filter
56 2×2 MIMO
58 frequency/timing estimation block
60 comparator
62 CD filter
64 frequency offset estimation block
66 frequency offset compensation block
68 combiner

The invention claimed is:

1. A receiver for receiving an optical signal comprising a plurality of carriers within a predetermined frequency band, wherein said optical signal comprising a plurality of carriers is a super channel signal or a subcarrier multiplex signal, said receiver comprising:
    means for sampling and converting each of the carriers into a set of corresponding digital signals, and
    one or more digital processing units for processing said digital signals of said set of digital signals such as to mitigate transmission impairments of the corresponding carriers based on corresponding processing parameters,
wherein at least one of said at least one digital processing units is configured for determining such processing parameters by carrying out a corresponding parameter derivation procedure based on one of the digital signals of said set of digital signals, said processing parameters reflecting, at least in part, transmission impairments of the corresponding received carrier,
wherein said at least one digital processing unit is/are configured for sharing thus determined processing parameters for processing of other digital signals among said set of digital signals based on
    said shared determined processing parameters, or
    processing parameters derived from said shared determined processing parameters, and
wherein said at least one digital processing unit is configured for
    comparing processing parameters determined based on different ones of said digital signals,
    selecting a subset of said determined processing parameters based on said comparison, and
    providing the selected subset of processing parameters for use in processing individual ones of said digital signals, and in particular all of said digital signals, based on said selected subset of processing parameters or processing parameters derived therefrom.

2. The receiver according to claim 1, wherein said transmission impairments comprise one or more of chromatic dispersion, polarization mode dispersion, differential group delay, polarization mixing, symbol timing uncertainties, carrier frequency drift or clock frequency drift on the transmitter or receiver side, fiber nonlinearities, power fluctuations, amplitude imbalances or phase imbalances.

3. The receiver according to claim 1, wherein the one or more digital processing unit(s) comprise(s) a digital filter, in particular a multiple input multiple output filter, and the processing parameters correspond to filter settings.

4. The receiver according to claim 3, wherein said filter is an FIR filter, and the processing parameters correspond to filter tap information.

5. The receiver according to claim 1, wherein said at least one digital processing unit is configured for
    determining approximative processing parameters by carrying out a corresponding parameter derivation procedure based on only one of the digital signals of said set of digital signals, and
    sharing said approximative processing parameters for processing some or all of the other digital signals based on said approximative processing parameters, or based on processing parameters derived therefrom.

6. The receiver according to claim 5, wherein said at least one digital processing unit is configured for determining said approximative processing parameters by searching within a possible space of parameters using a coarser granularity, and for deriving said processing parameters from said approximative processing parameters by searching within said space of parameters using a finer granularity.

7. The receiver according to claim 1 wherein said at least one digital processing unit is configured for
    sharing the determined processing parameters by combining processing parameters determined based on different ones of said digital signals, and
    providing the combined processing parameters for processing individual ones of said digital signals, in particular all of said digital signals, based on said combined processing parameters, or parameters derived therefrom.

8. The receiver according to claim 1, wherein said at least one digital processing unit is configured for determining said parameters based on different ones of said digital signals in an iterative procedure based on a predetermined start configuration, wherein said predetermined start configurations are different for different ones of said digital signals.

9. The receiver according to claim 1 wherein a frequency band has a band width of 800 GHz or less.

10. The receiver of claim 1, wherein the receiver comprises at least one photonic integrated circuit.

11. The receiver of claim 1, wherein said one or more digital signal processing units comprises a digital signal processor.

12. A method for receiving an optical signal comprising a plurality of carriers within a predetermined frequency band, wherein said optical signal comprising a plurality of carriers is a super channel signal or a subcarrier multiplex signal, said method comprising the following steps:
    sampling and converting each of the carriers into a set of corresponding digital signals,
    determining processing parameters for processing said digital signals of said set of digital signals such as to mitigate transmission impairments of the corresponding carriers based on corresponding processing parameters,
    processing said digital signals based on the thus determined processing parameters,
    comparing processing parameters determined based on different ones of said digital signals,
    selecting a subset of said determined processing parameters based on said comparison, and
    providing the selected subset of processing parameters for use in processing individual ones of said digital signals based on said selected subset of processing parameters or processing parameters derived therefrom,
wherein said determining of processing parameters comprises carrying out a parameter derivation procedure based on one of the digital signals of said set of digital signals, said processing parameter(s) reflecting, at least in part, transmission impairments of the corresponding received carrier, and sharing the thus determined processing parameter(s) for processing of other digital signals among said set of digital signals based on said shared determined processing parameters, or processing parameters derived from said shared determined processing parameters.

13. The method according to claim 12, wherein said transmission impairments comprise one or more of chromatic dispersion, polarization mode dispersion, differential group delay, polarization mixing, symbol timing uncertainties, carrier frequency drift or clock frequency drift on the transmitter or receiver side, fiber nonlinearities, power fluctuations, amplitude imbalances or phase imbalances.

14. The method according to one of claim 12, wherein the processing comprises a step of filtering the digital signals using a digital filter, in particular a multiple input multiple output filter, and the processing parameters correspond to filter settings.

15. The method according to one of claim 14, wherein said filter is an FIR filter, and the processing parameters correspond to filter tap information.

16. The method according to of one of claim 12, further comprising the steps of:

determining approximative processing parameters by carrying out a corresponding parameter derivation procedure based on only one of the digital signals of said set of digital signals, and sharing said approximative processing parameters for processing some or all of the other digital signals based on said approximative processing parameters, or based on processing parameters derived therefrom.

17. The method according to claim 16, further comprising a step of determining said approximative processing parameters by searching within a possible space of parameters using a coarser granularity, and deriving said processing parameters from said approximative processing parameters by searching within said space of parameters using a finer granularity.

18. The method according to claim 12, further comprising the steps of:

sharing the determined processing parameters by combining processing parameters determined based on different ones of said digital signals, and providing the combined processing parameters for processing individual ones of said digital signals, in particular all of said digital signals, based on said combined processing parameters, or parameters derived therefrom.

19. The method according to claim 12, further comprising a step of determining said parameters based on different ones of said digital signals in an iterative procedure, in particular in an iterative optimization procedure, based on a predetermined start configuration, wherein said predetermined start configurations are different for different ones of said digital signals.

* * * * *